United States Patent
Fleming et al.

(10) Patent No.: US 7,877,099 B2
(45) Date of Patent: Jan. 25, 2011

(54) COMPUTING SYSTEM WITH OFF-LOAD PROCESSING FOR NETWORKING RELATED TASKS

(75) Inventors: Kristoffer D. Fleming, Chandler, AZ (US); Robert J. Hunter, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 1889 days.

(21) Appl. No.: 10/750,100

(22) Filed: Dec. 31, 2003

(65) Prior Publication Data

US 2005/0198368 A1    Sep. 8, 2005

(51) Int. Cl.
*G06F 15/173* (2006.01)
(52) U.S. Cl. .................................... 455/453; 455/552.1
(58) Field of Classification Search ............. 455/414.1, 455/435.2, 453, 552.1
See application file for complete search history.

(56) References Cited

U.S. PATENT DOCUMENTS

| 6,976,205 | B1 | 12/2005 | Ziai et al. |
| 6,983,382 | B1 | 1/2006 | Hartke et al. |
| 7,017,042 | B1 | 3/2006 | Ziai et al. |
| 7,080,271 | B2 | 7/2006 | Kardach et al. |
| 2002/0093985 | A1* | 7/2002 | Nimmagadda .............. 370/493 |

* cited by examiner

*Primary Examiner*—Sam Bhattacharya
(74) *Attorney, Agent, or Firm*—Blakely, Sokoloff, Taylor & Zafman LLP

(57) ABSTRACT

A method is described that comprises executing a service selection method on an off load processor of a computing system to select an available network service for handling traffic sent to/from a handheld device. The execution of the service selection method is performed while a main CPU of said computing system is in a low power state.

18 Claims, 6 Drawing Sheets

COMPUTING SYSTEM WITH OFF-LOAD PROCESSING FOR NETWORKING RELATED TASKS

FIELD OF INVENTION

The field of invention relates to computing generally; and, more specifically, to a computing system with off-load processing for networking tasks.

BACKGROUND

A number of "efficiency" issues may perhaps impede the expansion of everyday life's dependence on mobile computing and mobile communications. The efficiency issues may be viewed as having both energy and management components. The energy component revolves around the fact that an end user's mobile devices (e.g., laptop/notebook computers, cell-phones, personal digital assistants (PDAs), etc.) use a battery as the electrical power source. To the extent these devices may consume battery power at what the user regards as too high a rate, the end user's mobile experience will be cumbersome (because, in the end user's eye, the mobile devices need to be recharged too often); and, as a consequence, the growth of the end user's dependence on mobile computing and mobile communications may lag or not develop at all. Therefore, those approaches aimed at extending battery life have a better chance at delivering a clearly beneficial mobile experience to an end user.

The management component involves security and/or dealing with a multitude of different devices, services and corresponding service providers. As an example, consider a present day traveling professional. Often times, a traveling professional will carry a laptop/notebook computer, a cell phone and a PDA. The traveling professional has, to first order, a security concern in that any, all, or some combination of the aforementioned devices are apt to be used to transport sensitive and/or confidential information over a non secure network (such as any public network (e.g., the Internet, a wireless "hot spot", etc.) or wide coverage wireless network); or, at least be accessible through a non secure network. Presently, in order to ensure that such information is secure, firewall and/or encryption/decryption functions are embedded into devices having access to a non secure network. Embedding sophisticated firewall and encryption/decryption software into each device (e.g., the laptop/notebook computer, a cell phone and a PDA as in the case of the traveling professional) having non-secure network access raises a few efficiency concerns.

Firstly, the IT personnel responsible for providing a secure environment will have a high burden as they will be responsible for the installation, maintenance, upgrading, etc. of security related software for multiple devices per employee. Handling the high burden either through additional IT personnel or through reduced turn-around-times amounts to inefficiency. Secondly, embedding security functions into each device raises the per unit cost of each device. Here, the higher cost may not only be the cost of the software itself; but also, the cost of a higher performance device hardware platform (because security functions tend to be sophisticated and therefore may require processing power beyond what would be needed without their implementation). Note that in this case a detrimental side effect on battery life is expected as higher processing power typically results in increased power consumption. Therefore, embedding security functions into various mobile devices may not only reveal management inefficiencies but also energy inefficiencies as well.

Lastly, there is management inefficiency in the sense that a myriad of different types of wireless services (e.g., GSM, CDMA, 802.11, Bluetooth, etc.) and service providers may be engaged by the traveling professional. Specifically, not only can the traveling professional use a different type of service and a different service provider for each of his/her wireless devices; but also, any single one of these devices may be capable of communicating with different service providers and/or over different wireless service types. The myriad of different service providers and network types expands the dimension of the billing records that need to be kept track of; which, in turn, corresponds to another type of inefficiency for wireless access.

FIGURES

The various embodiments of the present invention are illustrated by way of example, and not by way of limitation, in the figures of the accompanying drawings and in which.

Figure 3A:
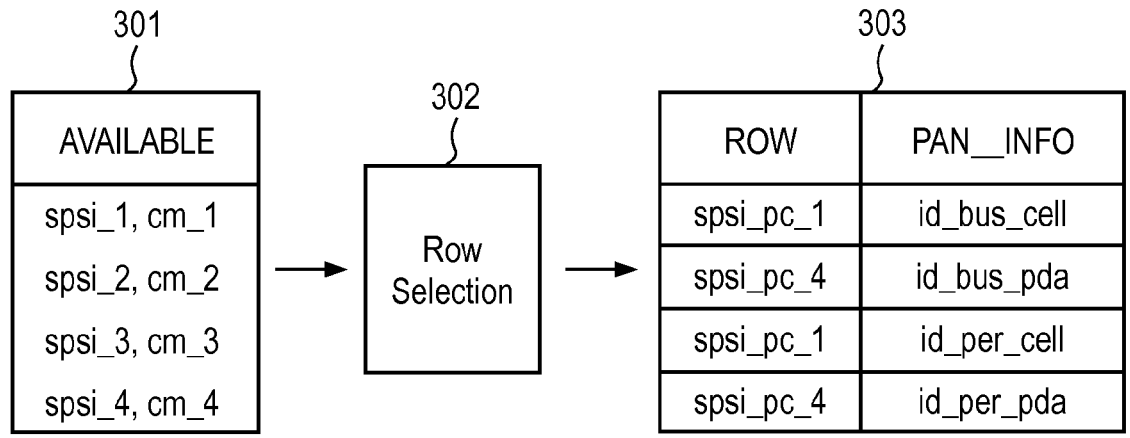
Figure 3B:
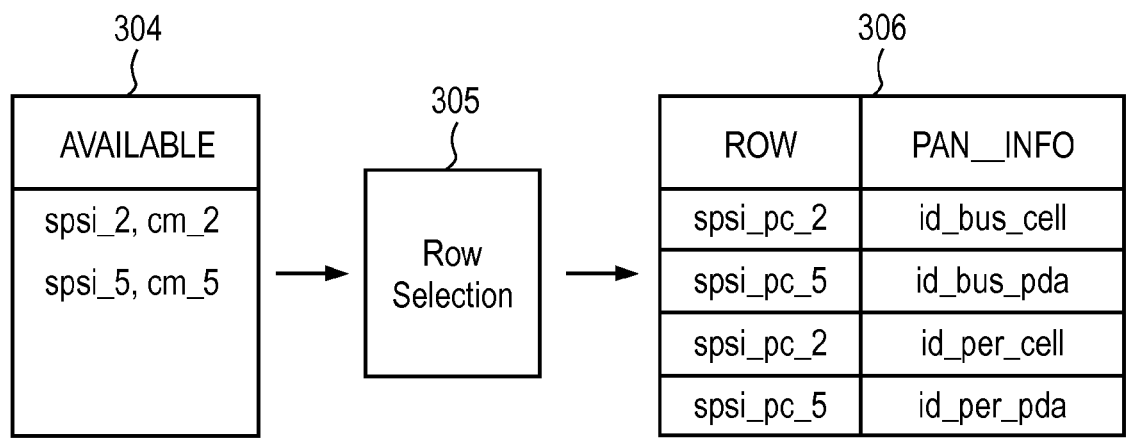

FIGS. 3a and 3b relate to the instantiation of cost metric data into a connection table's service provider specific information (SPSI);

FIGS. 4a through 4f show different software functions that may be executed by an off-load processor;

DETAILED DESCRIPTION

Considering the example of the traveling professional having a laptop/notebook computer, cell phone and PDA—efficiency gains may be realized by centralizing certain tasks to on off-load processor embedded within the laptop/notebook computer. Firstly, by executing security and other networking related software tasks on the laptop/notebook computer's off-load processor, these same software tasks need not be executed on the handheld cell phone and PDA devices. As a consequence, the cell phone and PDA devices should be less expensive at least because they do not need to have sophisticated security software if not also because they do not need to be designed with higher performance hardware components. Moreover, not being designed with higher performance hardware components corresponds to a gain in energy efficiency because battery life is extended with lower performance hardware components.

The addition of an off-load processor to a laptop or notebook computer can be made to have a practically insignificant effect on the power consumption of the computer by designing the computer's off-load processor to be operational even if the computer's main CPU and other significant, power consuming components are in a low power (or even powered down) state. That is, the computer can be designed to have an operational state in which the computer's main CPU and other significant, power consuming components will consume little or no power when they are not being used but the off load processor is being used. As a consequence, when engaged in a situation in which the computing system needs to be operational solely for the functional offerings of the off-load processor, energy consumption from unused components (e.g., main memory, disk drive, main CPU, graphics display, etc.) is largely avoided.

Figure 1:
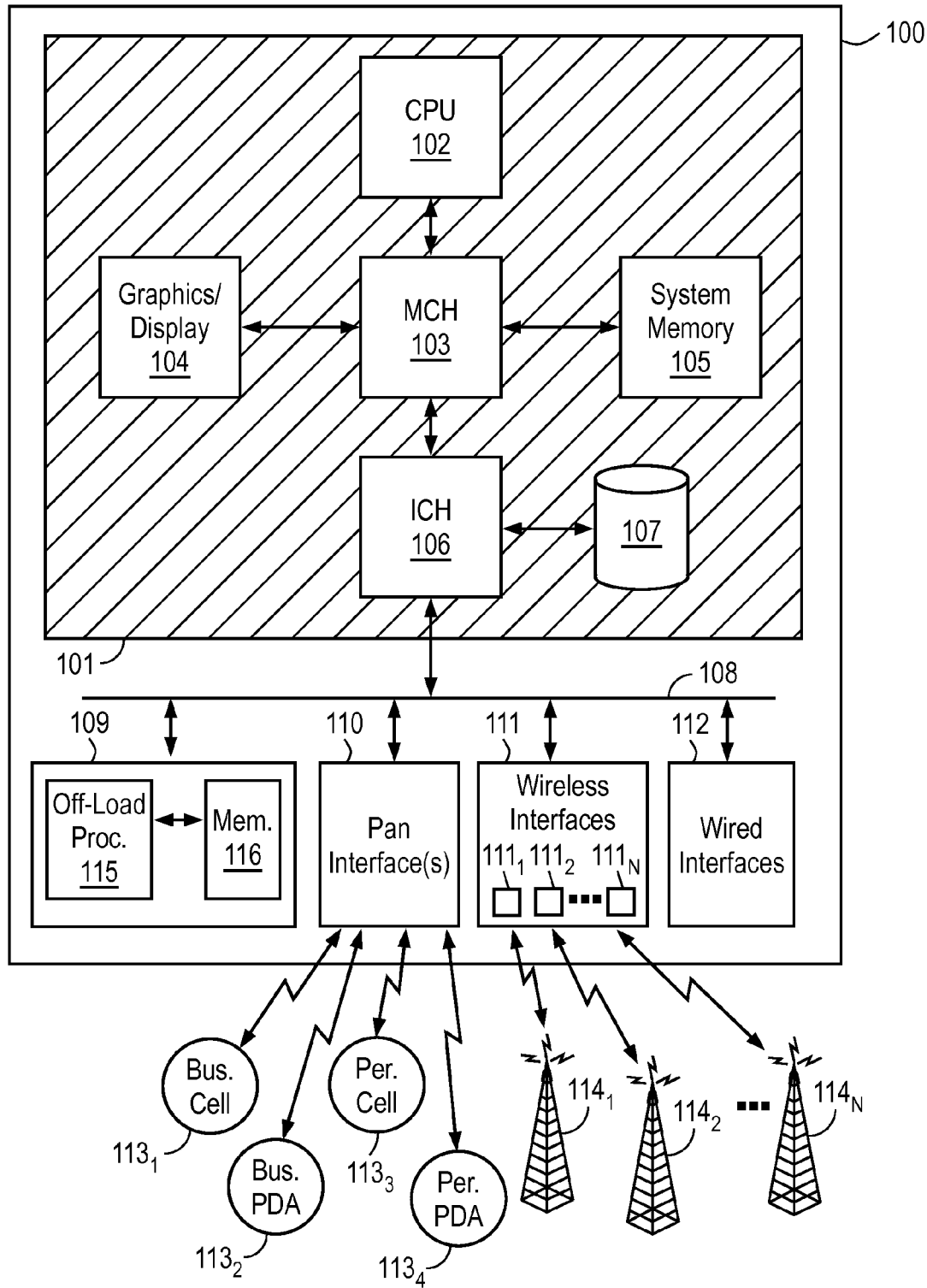
FIG. 1 shows a depiction of a computing system having an off-load processor for networking related tasks capable of maintaining a low power operational state.

FIG. 1 shows an exemplary architecture 100 for a computing system having an off-load processor 115 that can remain operative while other significant components, outlined in region 101, are powered down or placed into a low power state. According to the exemplary architecture of FIG. 1, the region 101 that is capable of being powered down or placed into a low power state while the off load processor 115 remains active includes the following system components: 1) the main CPU 102; 2) the memory control hub 103; 3) the system memory 105; 4) the computing system's graphics and display devices (e.g., thin film transistor (TFT) screen, graphics processor, etc.); 5) the I/O control hub 106; and, 6) the hard disk drive 107). For linguistic simplicity, region 101 will hereinafter be referred to as the computing system's "core" 101.

The system components that can remain active while the core 101 is in a reduced power state include: 1) the system bus 108 (e.g., a PCI bus); 2) various networking I/O components (e.g., one or more personal area network (PAN) interfaces 110, one or more non PAN wireless interfaces 111; one or more wired interface); and, 3) an off-load processing subsystem 109 which includes the off-load processor 115 and its associated memory 116. Here, the overall computing system 100 can be viewed as being implemented to have two functional computing systems: a primary computing system that "works" when the core 101 is active; and, a secondary computing system that can "work" when the core 101 is either active or inactive. The CPU for the secondary computing system is the off-load processor 115 and "hangs" off the system bus 108. Both computing systems share the I/O components 110, 111, 112 outlined above. Note that, at least when some function is to be performed by the computing system, the secondary computing system may be configured to be "always on" and the primary system may be configured to be transitionable between inactive and active states. Common types of wireless PANs include Bluetooth and Ultra Wideband (UWB).

Figure 2:
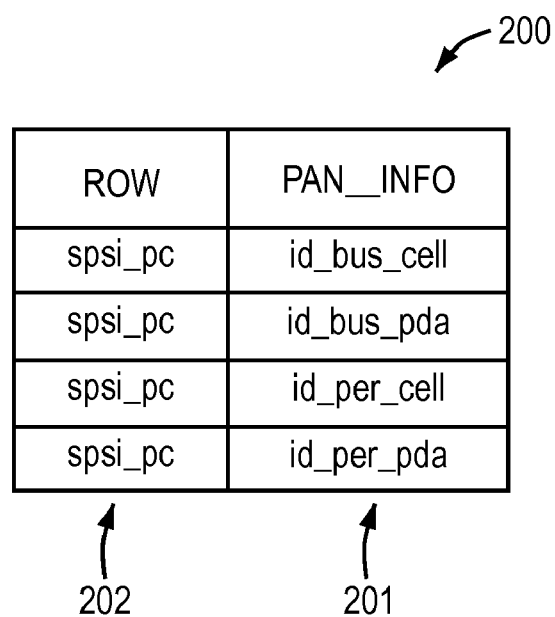
FIG. 2 illustrates an exemplary connection table maintained by an off-load processor.

FIGS. 2, 3a and 3b, and, 4a through 4e describe some of the types of functions that can be executed by an off-load processor. In particular, FIG. 2 describes an exemplary connection table when the off-load processor behaves as a centralized networking hub. FIGS. 3a and 3b relate to an extension of the information contained in a connection table for the purposes of ensuring that a lowest cost wireless connection is established. FIGS. 4a through 4e describe specific software routines that can be executed by the off-load processor.

Referring to FIGS. 1 and 2, efficiencies may be realized if the off-load processor behaves as a centralized communications hub. Here, to say that the off-load processor 115 behaves as a centralized communications hub means that one or more of the end-user's hand-held devices use the computing system 100 as a communications link to a wireless network rather than communicating with the wireless network directly. For example, continuing with the exemplary traveling professional, consider the situation in which the traveling professional travels with the following handheld devices: 1) a business cell phone $113_1$ for professional needs; 2) a business PDA $113_2$ for professional needs; 3) a personal cell phone $113_3$ for personal needs; and, 4) a personal PDA $113_4$ for professional needs.

With the off-load processor 115 behaving as a centralized communications hub, the traveling professional might send an email message from the business PDA $113_2$ to a wireless network by effectively transporting the email message according to the following flow: 1) wirelessly, from the business cell phone $113_1$ to the computing system's PAN interface 110; 2) within the computing system 100, from the PAN interface 110 to an appropriate wireless interface (e.g., wireless interface $111_1$); and, 3) wirelessly, from the appropriate wireless interface $111_1$ to the wireless network (represented by base station antennae $114_1$). Here, the off-load processor 115 might perform a number of functions that the business PDA $113_2$ need not perform in order to facilitate the communication flow outlined just above.

For example, the off-load processor 115 may: 1) establish and manage communication with the target wireless network $114_1$; and, 2) encrypt the email message before its transmission over the wireless network $114_1$ (e.g., by sending the email message over the system bus 108 to the off-load processing subsystem 109 after it is received at the PAN interface 110; and then, sending the email message from the off-load processing subsystem 109 to the appropriate wireless interface after it has been encrypted). Likewise, the off-load processor 115 might perform a number of functions that the business PDA $113_1$ need not perform in order to receive an email message according to a reverse of the flow outlined above (e.g., from wireless network $114_1$ to appropriate wireless network interface $111_1$; from wireless network interface $111_1$ to off-load processing sub-system 109; from off-load processing sub-system 109 to PAN interface 110; and, from PAN interface 110 to business PDA $113_2$). Such functions may include: 1) establishment and management of communication with the appropriate wireless network $114_1$; and, 2) decryption of the email message before its transmission over the PAN to the business PDA $113_2$.

Such functional services may be performed by the off-load processor 115 not only for the business PDA $113_2$ but also, conceivably, for any of the traveling professional's other handheld devices $113_1$, $113_3$, $113_4$ having PAN access. Encryption/decryption and connection management/establishment might therefore never be performed by the handheld devices $113_1$, $113_3$, $113_4$ while the traveling professional is traveling. With respect to encryption/decryption, note that efficiency gains may be realized in a number of ways. Firstly, the IT department's burden is reduced to the configuration and maintenance of only a single instance of encryption/decryption software that is executed by the off-load processor 115. Here, note that the encryption/decryption services provided by the off-load processor 115 need not be limited to serving the hand-held devices 113 reachable through a PAN; but also, may be "system wide" in the sense that such services are also provided for the core 101 when it is active (i.e., the core 101 need not have its own instance of encryption/decryption software). Secondly, less expensive handheld devices devoid of encryption/decryption software and corresponding processing power may be procured.

With respect to non-PAN wireless network connection management and establishment not being entertained by the handheld devices $113_1$, $113_3$, $113_4$ while they are in reach of the computing system's PAN, efficiency opportunities exist with respect to both energy and management. With respect to energy, the handheld devices need only transmit with lowest power because their transmissions are limited to the immediately proximate computing system 100 via the PAN; and, as consequence, battery life can be extended. With respect to management efficiency, as explained in more detail immediately below, the myriad of wireless service types and service providers may be streamlined or otherwise screened for simplicity and/or cost reduction.

FIG. 2 shows connection table information that the off load processor may use to establish a connection or communication session between a handheld device and a wireless network. The specific connection table information 200 of FIG. 2 may be maintained within the off load processor's corresponding memory 116 for an environment in which only a single wireless service provider is engaged for all four handheld devices $113_1$, $113_2$, $113_3$, $113_4$. Once the set of handheld devices that the off-load processor 115 is to support has been defined, the connection table can be viewed as having PAN-side information 201 and "rest-of-world" side (ROW-side) information 202.

The PAN-side information 201 keeps track of the addresses (or other forms of identification) for the handheld devices that the off load processor 115 is to support (e.g., id_bus_cell for business cell phone 113$_1$; id_bus_pda for business PDA 113$_2$; id_per_cell for personal cell phone 113$_3$; and, id_per_pda for business PDA 113$_3$). Because the handheld devices share the same wireless space, unique addresses are assigned to each device so that broadcasts to/from any specific device can be accomplished. Thus, in order to send a message from the computing system 100 to a specific handheld device, the off-load processor 115 may retrieve from its memory 116 the appropriate address from table 203.

The ROW-side information 202 includes service provider specific (SPS) information. Note that the table 200 is organized to correlate certain SPS information 202 to each handheld device. The SPS information 202 may be configured to contain an address (similar to the PAN addresses discussed above) that a wireless service provider can use to identify the end_user it is communicating with. Such an address serves as a label that allows the service provider's network to delineate connections between different end users and bill them appropriately.

According to the specific table arrangement 200 of FIG. 2, note that the computing system's SPS information (SPSI_PC) is to be used for each of the handheld devices 113$_1$, 113$_2$, 113$_3$, 113$_4$. That is, the computing system is the "end user" recognized by the service provider and the "bill" for communications involving each of the four hand-held devices 113$_1$, 113$_2$, 113$_3$, 113$_4$ is accumulated on the account for the computing system 100 by the computing system's wireless service provider rather than on the accounts for any of the hand-held devices 113$_1$, 113$_2$, 113$_3$, 113$_4$ or their corresponding service providers.

As a brief aside topic, note that there is a recognized distinction in the art between "real-time" networking traffic and "data" networking traffic. Real time networking traffic is traffic that is sensitive to end-to-end propagation delay (e.g., telephony traffic or live video traffic) while "data" traffic is traffic that is less sensitive to end-to-end propagation delay (e.g., emails, .XML files downloaded during web-surfing, etc.). As many wireless service providers are already rolling out or planning to roll out wireless networks capable of successfully carrying both real-time traffic and data traffic (e.g., 2.5G, 3G), opening a wireless account for the computing system 100 with a service provider whose network is capable of carrying both real time traffic and data traffic provides a partial infrastructure for the computing system 100 to handle both real time handheld traffic (e.g., voice conversations to/from the business cell phone 113$_1$ or personal cell phones 113$_3$) and handheld data traffic (e.g., emails and/or web surfing messaging to/from the business PDA 113$_2$ or personal cell PDA 113$_4$).

As data traffic is generally insensitive to propagation delay, no serious implementation issues arise with respect to the computing system's ability to communicate data traffic between the handheld devices and a wireless network. With respect to real-time traffic, however, the propagation delay added to a real time communication by the computing system should be addressed.

For many real time applications, a propagation delay of no more than 10 ms through the computing system should be permitted for a real time communication. Referring back to FIG. 1, if real time information is not processed by the off-load processor once the off-load processor establishes the real time connection (i.e., live real time traffic is passed directly over the system bus 108 between the PAN interface 110 and the appropriate wireless interface 111 without intervention by the off-load processing subsystem, the propagation delay $t_{PD}$ through the computing system can be approximated for a 300 kb/s real time connection as:

$$t_{PD} \approx t_{PAN} + t_{BUS} + t_{WN} \qquad \text{EQN. 1}$$

where: 1) $t_{PAN}$ is the processing delay of the PAN interface 110; 2) $t_{BUS}$ is the processing delay of the system bus; and 3) $t_{WN}$ is the processing delay of the appropriate wireless network interface 111. Typical values with standard technology (e.g., Bluetooth) for $t_{PAN}$ and $t_{WN}$ are 600 μs; and, a typical value for $t_{BUS}$, if any waiting time for other bus traffic is ignored, is 10 μs. Here, ignoring any waiting time for other bus traffic is a reasonable approximation because the system bus 108 can be configured to prioritize real time traffic when it presents itself.

Referring to FIGS. 3a and 3b note that the computing system 100 may be designed with multiple non PAN wireless interfaces 111 (e.g., GSM, CDMA, BLUETOOTH, 802.11, etc.) and non PAN wired interfaces 112 (e.g., Ethernet, telephony MODEM, etc.). As a consequence, conceivably, any such non PAN interface can be viewed as a potential ROW connection for the computing system 100 to use. This opens up the possibility of evaluating multiple ROW connections per handheld device; and, also, configuring a certain ROW connection for a first group of one or more handheld devices and configuring another ROW connection for a second, different group of one or more handheld devices. FIGS. 3a and 3b explore these features in more detail.

Referring to FIG. 3a, the off-load processor 115 may maintain an awareness of the potential networking services currently available to the computing system. For example, if the computing system has a pair of cellular accounts with differing cellular physical layer technologies (e.g., a first account for GSM service with a first service provider and a second account for CDMA 2000 service with a second service provider), wireless interfaces 111 will include hardware compatible for communicating over the first physical layer technology (e.g., GSM interface 111$_1$) and the second physical layer technology (e.g., CDMA 2000 interface 111$_2$). Moreover, the computing system may be retrofitted with a pair of wireless LAN interfaces (e.g., BLUETOOTH interface 111$_3$ and 802.11 interface 111$_4$). A traveling professional sitting in an airport might easily be within range of a working network for each of the four networks described above (e.g., a GSM network offered by the first service provider, a CDMA 2000 network offered by the second service provider, a BLUETOOTH "hot spot" offered by a licensee of commercial space in the airport; and, an 802.11 "hot spot" offered by the airport).

Here, network service and discovery software may be executed upon the off-load processor 115 so that an awareness of the four networks is established (noting that the wireless hardware interfaces 111$_1$ through 111$_4$ are expected to work harmoniously with the off load processor 115 and corresponding wireless network in order to assist the network service and discovery process). An embodiment of such an understanding 301 is provided in FIG. 3a (e.g., spsi_1 for the GSM network service provider; spsi_2 for the CDMA 2000 network service provider; spsi_3 for the BLUETOOTH service provider (i.e., the commercial space licensee); and, spsi_4 for the 802.11 service provider (i.e., the airport). In a basic embodiment, the billing rate (or some generic "cost metric" (cm) determine by the data rate provided and the cost of the service) for wireless service for each of the cellular providers is previously stored in the computing system from their corresponding, already agreed to, service contract (e.g., cm_1 for the first cellular network, cm_2 for the second cellular network); and, the billing rate for each of the wireless LAN services is obtained through the automatic network service and discovery process (e.g., cm_3 for the second cellular network, and cm_4 for the second cellular network).

With an understanding of the billing rate for each service, an evaluation 302 may commence by which the most cost efficient ROW connection is identified for each handheld device. The evaluation can be performed with software that takes into account additional policies and may be executed on the off-load processor 115. For the sake of example consider an evaluation process designed to enforce the following policies: 1) cell phone handhelds must only communicate over cellular networks; and, 2) PDAs must not communicate over cellular networks. If these policies are enforced and if cm_1<cm_2 and cm_4<cm_3; then, the connection table observed 303 can be automatically formed in the off load processor's corresponding memory 116.

Here, policy 1 above causes only spsi_1 and spsi_2 to be viable options for both the business and personal cell phones; and, cm_1<cm_2 corresponds to the second cellular service provider being more expensive than the first service provider. Therefore, as indicated in connection table 303, the ROW connection for both cell phones is setup as the first cellular service provider spsi_1. Likewise, policy 2 above causes only spsi_3 and spsi_4 to be viable options for both the business and personal PDAs; and, cm_4<cm_3 corresponds to the commercial space licensee's service being more expensive than the airport's service. Therefore, as indicated in connection table 303, the ROW connection for both PDAs is setup as the airport's wireless LAN spsi_4.

The updating of the connection table may take place continuously and automatically and, according to one approach, irrespective of whether or not the traveling professional ever attempts to use any of the handheld devices. That is, because the connection table may be easily updated, the computing system may continuously monitor and evaluate its surroundings (provided the off load processor sub system 109 and relevant I/O remain powered on). That the connection table can be easily updated when the computing system enters new surroundings is made apparent by reference to FIG. 3b. Here, assume that the traveling professional has traveled to a new airport.

From the understanding 304 developed at the new airport, access to the first cellular service provider's network is not available but access to the second cellular service provider's network is available (i.e., spsi_1 is not present but spsi_2 is present). Moreover, access to the first airport's wireless LANs is lost (obviously); but, access to another wireless LAN is possible at the second airport (spsi_5). Here, implementation of policy 1 causes the ROW selection process 305 to be limited to the second cellular service provider as the only option for both cell phones; and, policy 2 causes the ROW selection process 305 to be limited to the new wireless LAN as the only option for both PDAs. The newly updated connection table 306 therefore lists spsi_2 for both cell phones and spsi_5 for both PDAs.

FIGS. 4a through 4e illustrate various types of software routines that may be executed by the off load processor 115—some of which have already been discussed above.

Figure 4A:
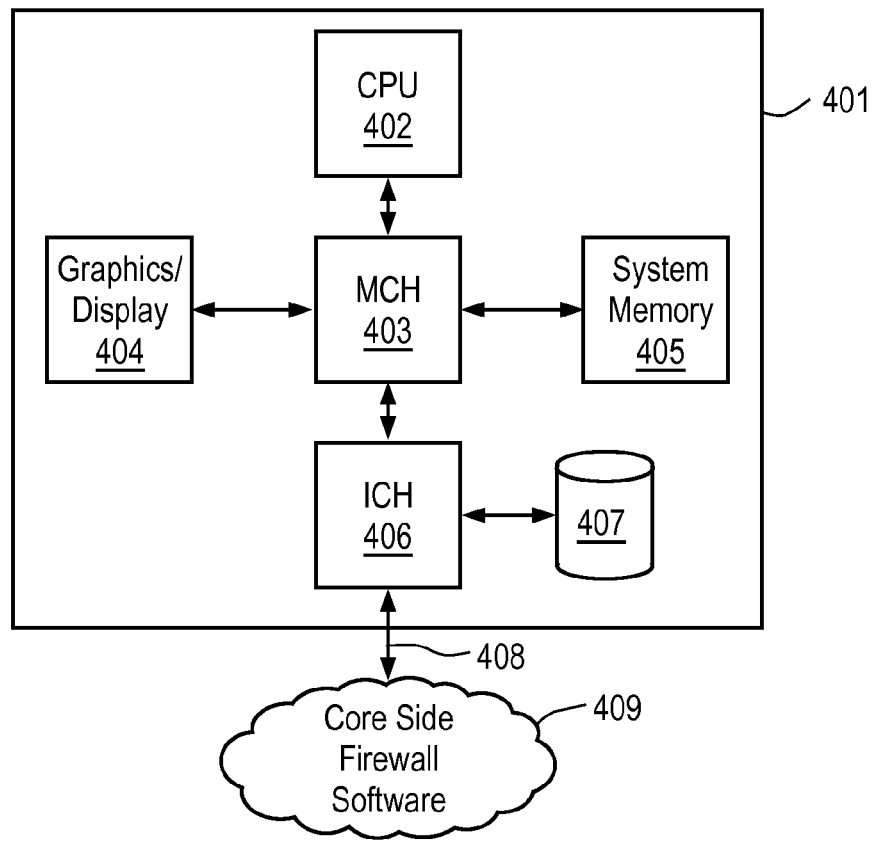

FIG. 4a indicates that firewall software 409 that protects the core 401 may be executed by the off-load processor 115. Here, as the off-load processor can be configured to act as a communication control hub, attempts to reach the core 401 through a networking interface may first be screened with firewall software that protects the core's data from unwelcome attempts to extract or deposit information.

Figure 4B:
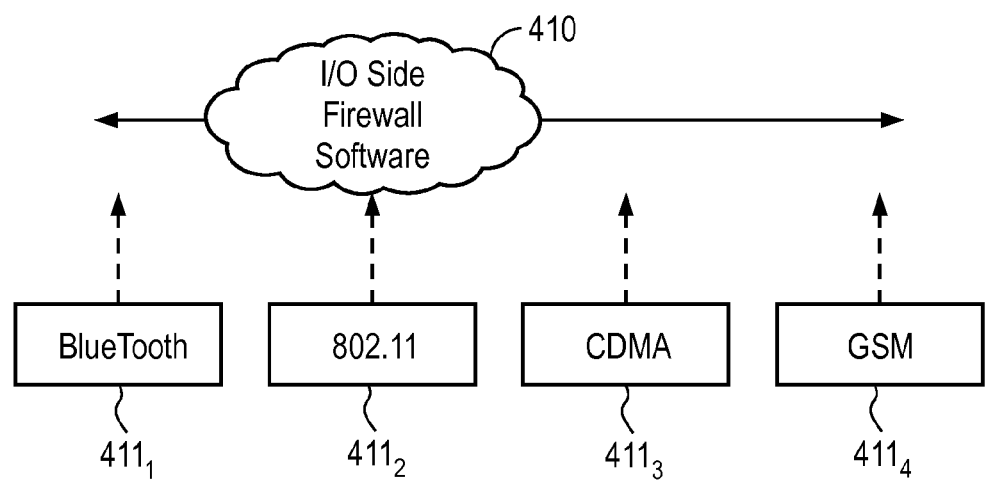

Likewise, referring to FIG. 4b, the off load processor can execute firewall software 410 that protects the handheld devices from unwanted intrusion. Note that a single firewall package can be used for the handheld devices. FIG. 4b attempts to convey this schematically by suggesting that using a single firewall package for a plurality of wireless devices is akin to "sliding" the firewall software 410 to whichever I/O interface $411_1$ through $411_4$ is presenting a potentially unwelcome intrusion. By protecting both the core and the handheld devices, the off-load processor effectively creates a comprehensively protected environment.

Figure 4C:
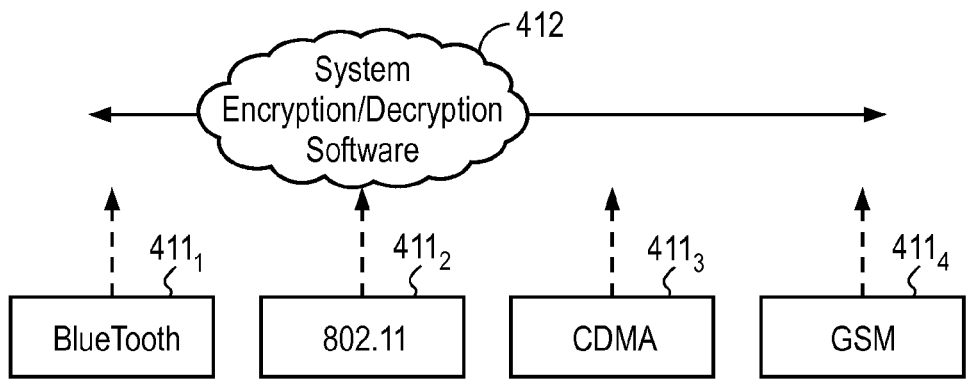

FIG. 4c indicates that the off load processor can also execute encryption/decryption software 412 for communications between the handheld devices and the outside world. Typically, messages sent from a handheld device toward the outside world are encrypted by the off load processor; and, encrypted messages sent toward a handheld device from the outside world are decrypted by the off-load processor.

Figure 4D:
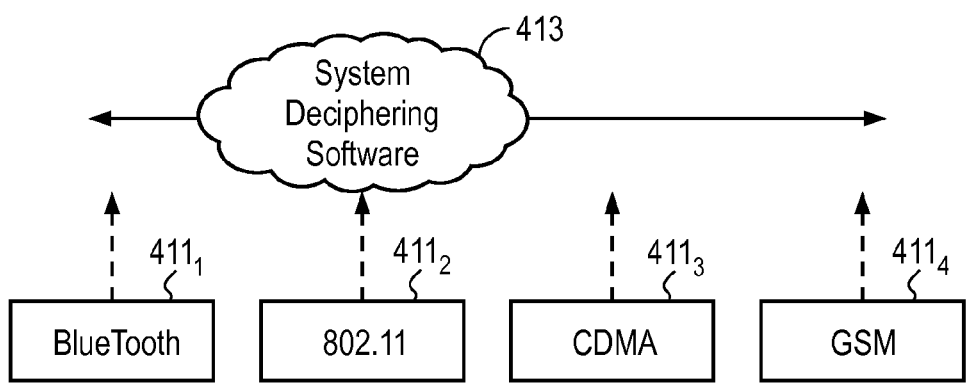

FIG. 4d indicates that deciphering software 413 can also be executed by the off-load processor. With the recognition that wireless communications are a shared media networking approach, a device within a wireless network will receive the transmissions of other devices even if it is not an intended recipient. Deciphering is a threshold function that determines whether or not a received packet is destined for another device. If so the packet is discarded. If not the packet is accepted.

Figure 4E:
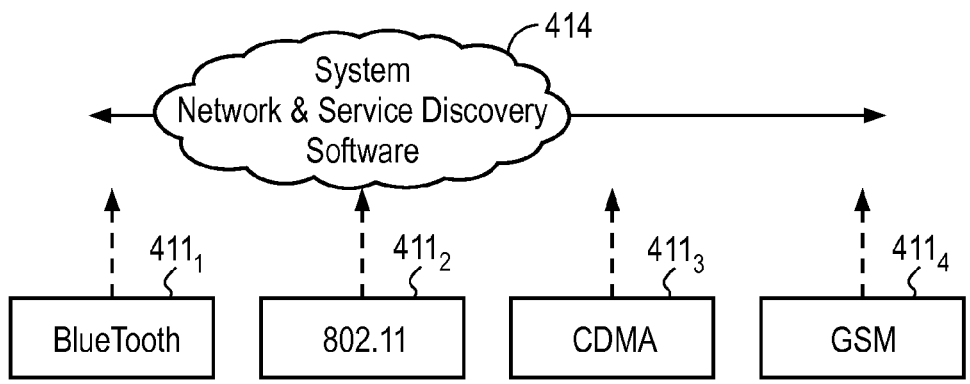

FIG. 4e indicates, as discussed at length above with regard to FIGS. 3a and 3b, that software related to network service and discovery 414 can be executed by the off-load processor. By executing the network service and discovery function, the off load processor should be able to continuously recognize changes in the surrounding wireless landscape and determine which networks are most efficient in light of cost metrics and pre-configured policies.

Figure 4F:
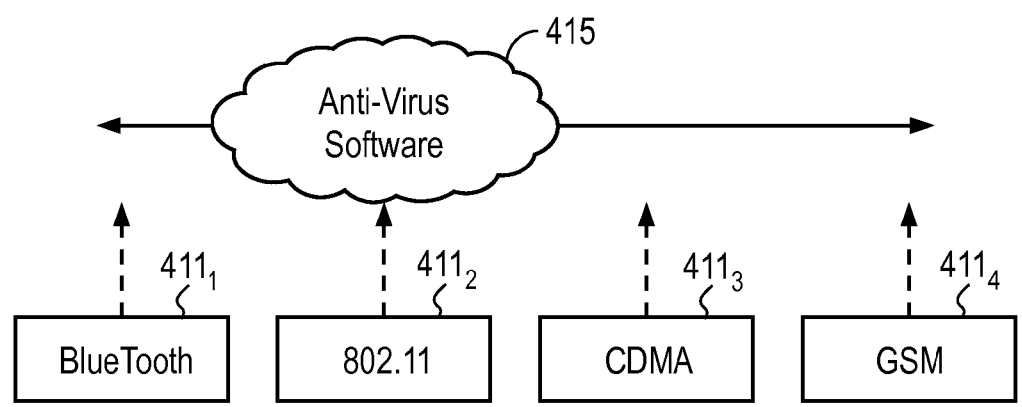

FIG. 4f indicates that anti-virus software 415 can be executed by the off load processor. By executing anti-virus software 415, the offload processor should be able to flag virus infected messages received from any of interfaces $411_1$-$411_4$.

It is also to be understood that because aspects of the present teachings may be implemented as one or more software programs, such aspects may be implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed:

1. A method, comprising:

executing a service selection method on an off load processor of a laptop/notebook computing system that is capable of communicating with a handheld device to dynamically select an available wide area wireless network service for handling telephony traffic sent to/from said handheld device, said executing being performed while a main CPU of said computing system is in a low power state, said handheld device capable of communicating telephony traffic to and receiving telephony traffic from a wide area wireless network.

2. The method of claim 1 wherein said selection method further comprises discovering that said available network service is available within said computing system's present environment prior to any handling of traffic for said handheld device.

3. The method of claim 2 wherein said selecting further comprises selecting said available service because it has a lowest cost metric amongst a plurality of available network services.

4. The method of claim 2 wherein said selecting further comprises selecting said network service according to a pre-determined policy.

5. The method of claim 2 wherein said selection method further comprises maintaining a table within a memory coupled to said off load processor, said memory having an entry that correlates said available network service with an identity of said handheld device, said identity to communicate with said handheld device.

6. The method of claim 5 wherein said selection method further comprises updating said table as a consequence of said computing system entering a new environment of available network services.

7. A machine readable storage having program code that when processed by a laptop/notebook computing system causes said laptop/notebook computing system to perform a method comprising:

executing a service selection method on an off load processor of a laptop/notebook computing system that is capable of communicating with a handheld device to dynamically select an available wide area wireless network service for handling telephony traffic sent to/from said handheld device, said executing being performed while a main CPU of said computing system is in a low power state, said handheld device capable of communicating telephony traffic to and receiving telephony traffic from a wide area wireless network.

8. The machine readable medium of claim 7 wherein said selection method further comprises discovering that said available network service is available within said computing system's present environment prior to any handling of traffic for said handheld device.

9. The machine readable medium of claim 7 wherein said selecting further comprises selecting said available service because it has a lowest cost metric amongst a plurality of available network services.

10. The machine readable medium of claim 7 wherein said selecting further comprises selecting said network service according to a pre-determined policy.

11. The machine readable medium of claim 7 wherein said selection method further comprises maintaining a table within a memory coupled to said off load processor, said memory having an entry that correlates said available network service with an identity of said handheld device, said identity to communicate with said handheld device.

12. The machine readable medium of claim 7 wherein said selection method further comprises updating said table as a consequence of said computing system entering a new environment of available network services.

13. A laptop/notebook computer having a storage device and program code stored thereon that when processed by said laptop/notebook computer causes said laptop/notebook computer to perform a method, comprising:

executing a service selection method on an off load processor of a laptop/notebook computing system that is capable of communicating with a handheld device to dramatically select an available wide area wireless network service for handling telephony traffic sent to/from said handheld device, said executing being performed while a main CPU of said computing system is in a low power state, said handheld device capable of communicating telephony traffic to and receiving telephony traffic from a wide area wireless network.

14. The laptop/notebook computer of claim 13 wherein said selection method further comprises discovering that said available network service is available within said computing system's present environment prior to any handling of traffic for said handheld device.

15. The laptop/notebook computer of claim 13 wherein said selecting further comprises selecting said available service because it has a lowest cost metric amongst a plurality of available network services.

16. The laptop/notebook computer of claim 13 wherein said selecting further comprises selecting said network service according to a pre-determined policy.

17. The laptop/notebook computer of claim 13 wherein said selection method further comprises maintaining a table within a memory coupled to said off load processor, said memory having an entry that correlates said available network service with an identity of said handheld device, said identity to communicate with said handheld device.

18. The laptop/notebook computer of claim 13 wherein said selection method further comprises updating said table as a consequence of said computing system entering a new environment of available network services.

* * * * *